US012676130B2

(12) United States Patent
Wanne

(10) Patent No.: US 12,676,130 B2
(45) **Date of Patent: *Jul. 7, 2026**

(54) INSTRUMENT WITH INTERIOR BODY WALLS HAVING AIRFLOW DISRUPTION APPARATUS

(71) Applicant: Wanne Inc., Bellingham, WA (US)

(72) Inventor: Theo Wanne, Bellingham, WA (US)

(73) Assignee: Wanne Inc., Bellingham, WA (US)

( * ) Notice: Subject to any disclaimer, the term of this patent is extended or adjusted under 35 U.S.C. 154(b) by 487 days.

This patent is subject to a terminal disclaimer.

(21) Appl. No.: 18/206,211

(22) Filed: Jun. 6, 2023

(65) Prior Publication Data

US 2023/0317036 A1 Oct. 5, 2023

Related U.S. Application Data

(63) Continuation-in-part of application No. 17/174,727, filed on Feb. 12, 2021, now Pat. No. 11,749,235, (Continued)

(51) Int. Cl.
*G10D 9/10* (2020.01)
*G10D 7/06* (2020.01)
(Continued)

(52) U.S. Cl.
CPC ................ *G10D 9/10* (2020.02); *G10D 7/06* (2013.01); *G10D 7/10* (2013.01); *G10D 9/035* (2020.02)

(58) Field of Classification Search
CPC .. G10D 9/10; G10D 7/06; G10D 7/10; G10D 9/035; G10D 9/02; G10D 7/08; G10D 7/063; G10D 7/066
See application file for complete search history.

(56) References Cited

U.S. PATENT DOCUMENTS

| | | | |
|---|---|---|---|
| 2,180,130 | A | 11/1939 | Swanson |
| 2,608,122 | A | 8/1952 | Solarz |

(Continued)

FOREIGN PATENT DOCUMENTS

| | | | |
|---|---|---|---|
| JP | 2005-331613 | A | 12/2005 |
| JP | 2006113141 | A | 4/2006 |

(Continued)

OTHER PUBLICATIONS

International Searching Authority of the PCT; "Notification of Transmittal of the International Search Report and the Written Opinion of the International Seaching Authority"; PCT Application No. PCT/US21/58052; dated Jan. 26, 2022; pp. 1-10.

(Continued)

*Primary Examiner* — Kimberly R Lockett
(74) *Attorney, Agent, or Firm* — Robinson & Cole LLP

(57) ABSTRACT

An instrument having an interior body or column wall that includes a plurality of curvilinear modifications that disrupts airflow through the mouthpiece in order to produce a pleasing sound when a player is playing an instrument. The modifications may comprise raised curvilinear ridges or curvilinear valleys set into the body wall. Additionally, the modifications may include specific patterns designed to elicit different, yet still pleasing sounds from the instrument. These air-flow disruption modifications are separate and distinct from any tone-changing actuators of the instruments as the instrument may be a woodwind (with tome holes) or a brass instrument (with valves or sliders).

20 Claims, 7 Drawing Sheets

Related U.S. Application Data which is a continuation-in-part of application No. 17/094,530, filed on Nov. 10, 2020, now Pat. No. 11,538,447.

(51) Int. Cl.

| | |
|---|---|
| ***G10D 7/10*** | (2006.01) |
| ***G10D 9/035*** | (2020.01) |

(56) References Cited

U.S. PATENT DOCUMENTS

| | | | | |
|---|---|---|---|---|
| 11,538,447 | B2 * | 12/2022 | Wanne | G10D 9/035 |
| 11,749,235 | B2 * | 9/2023 | Wanne | G10D 9/02 84/383 R |
| 2005/0087057 | A1 | 4/2005 | Taillard | |
| 2007/0044636 | A1 | 3/2007 | Wanne | |
| 2008/0083316 | A1 | 4/2008 | Wanne | |
| 2010/0011937 | A1 | 1/2010 | Hamanaga | |

FOREIGN PATENT DOCUMENTS

| | | | |
|---|---|---|---|
| RU | 2035068 | C1 | 5/1995 |
| WO | 2000065570 | A1 | 11/2001 |

OTHER PUBLICATIONS

European Patent Office: "Extended European Search Report" dated Dec. 20, 2024; EP Application No. 21926011.4; pp. 1-32; (2024).

* cited by examiner

INSTRUMENT WITH INTERIOR BODY WALLS HAVING AIRFLOW DISRUPTION APPARATUS

PRIORITY CLAIM

This application is a Continuation-in Part application and claims the benefit of U.S. patent application Ser. No. 17/094,530, entitled "INSTRUMENT MOUTHPIECE WITH AIR FLOW DISRUPTION APPARATUS," filed Nov. 10, 2020 (now U.S. Pat. No. 11,538,447, issued Dec. 27, 2022) and U.S. patent application Ser. No. 17/174,727, entitled "INSTRUMENT MOUTHPIECE WITH CURVILINEAR AIR FLOW DISRUPTION APPARATUS," filed Feb. 12, 2021, both of which are incorporated by reference in its entirety herein for all purposes.

BACKGROUND

Musical instruments are popular and prominent throughout the world in popular culture as well as professional and recreational setting. A specific subset of musical instruments includes wind instruments, whereupon yet another subset of that includes woodwinds. Woodwind instruments are musical instruments comprising a main body used to define a column of air whereupon a mouthpiece is at the front of the body designed to be engaged by a human that provides air by blowing through the mouthpiece. As is well known, within the body the acoustic characteristics of the column may be modified by various means of holes, openings and valves. Further, the air column is vibrated by a wooden reed (i.e., woodwind instrument) disposed in a mouthpiece attached to the body intake by means of a ligature made of metal, or other material. Typically, reeds are made from a cane plant (e.g., wood) but newer methodologies are introducing synthetic materials for reed formation and use.

This basic concept of blowing air through an instrument to produce musically pleasing sounds is also similar for brass instruments that do not involve a reed in a respective mouthpiece. However, brass instruments still have a mouthpiece coupled to a neck that may then be coupled to a column (e.g., a body) whereon different valves and/or sliders may be actuated to produce differing lengths of the column.

Musical instrument manufacturers strive to innovate several distinct aspects of their musical instruments including the body, the mouthpiece, the valves (in brass instruments) and the reed (in woodwind instruments). As different innovations are brought to market, different musicians from different musical genres may tend to embrace or reject innovations as the innovation may affect the overall sound produced by the musical instruments in ways that tend toward classic sounds or toward modern sounds. To this end, with the array of musical tastes and interests in music being beautifully diverse, musical instrument innovators strive to provide novel innovations to appeal to this diversity.

BRIEF DESCRIPTION OF THE DRAWINGS

The subject matter presented herein will now be described, by way of example, with reference to the accompanying drawings, in which.

DETAILED DESCRIPTION

Figure 1:
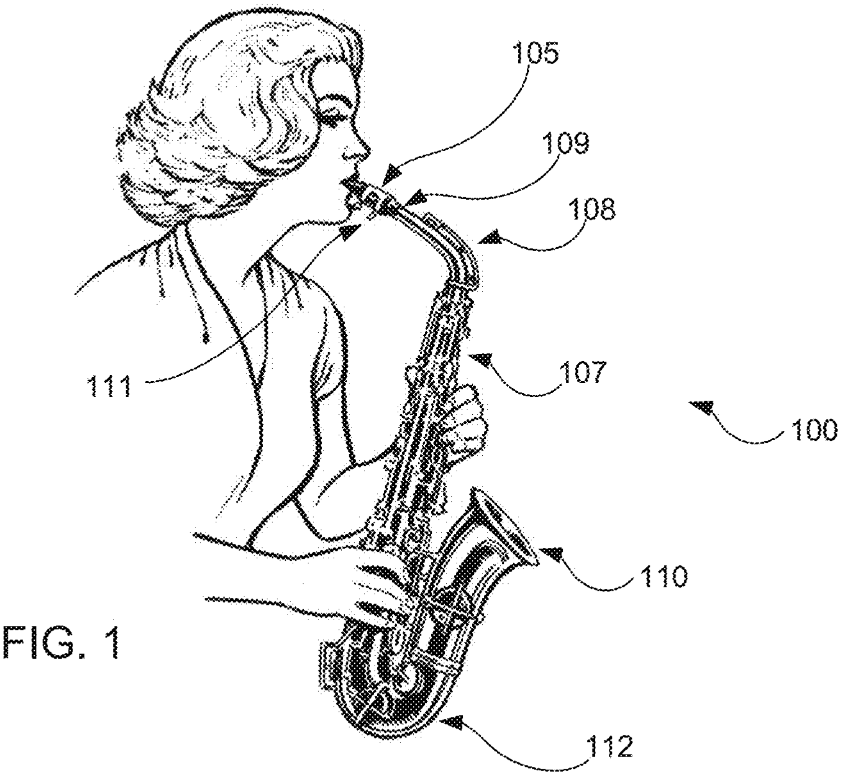
FIG. 1 is a diagram of a musical instrument having a mouthpiece according to an embodiment of the subject matter disclosed herein.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" as required by 35 U.S.C. § 112.

Byway of an overview, the descriptions of mouthpieces, instruments, and methods disclosed herein are directed to an instrument mouthpiece, neck, or body having an interior wall that includes a plurality of curvilinear modifications on an inner wall that disrupts airflow through the mouthpiece or column in order to effect a pleasing sound when a player is playing an instrument. In one embodiment, the curvilinear modifications comprise curvilinear raised ridges disposed on the inner wall of a body or column of the instrument while in another embodiment, the modification are curvilinear valleys carved into the body wall. Additionally, the modifications may include specific patterns designed to elicit different, yet still pleasing sounds from the instrument. These patterns may include a first pattern having a first central linear modification flanked by a set of modifications having parabolic elongated modifications wherein each modification has a parabolic focus increasingly more distant from each respective modification in a direction away from the central modification and also flanked by a set of modifications having parabolic elongated modifications fashioned in the opposite direction. In other embodiments, the modifications are linear but spaced apart from each other in an increasingly distant pattern. In still other embodiments, the modifications are sinusoidal modifications (both in a lateral manner and in a curvilinear manner regarding a depth of a ridge or a shape of the raised ridge. These and other aspects may be more readily understood and further detailed with respect to the detailed description below with reference to FIGS. 1-10.

Turning attention to the figures, FIG. 1 is a diagram of a person playing musical instrument 100 having a mouthpiece 105 according to an embodiment of the subject matter disclosed herein. In this embodiment, the musical instrument 100 is a saxophone. For this discussion and throughout this disclosure, the musical instrument may be discussed in terms of a saxophone, but the skilled artisan understands that the concepts detailed about the musical instrument mouthpiece 105 apply equally to any woodwind instrument including all manner of saxophones (e.g., alto saxophones, tenor saxophones, baritone saxophones, and the like) as well as clarinets, oboes, bassoons, and the like. In FIG. 1, a typical saxophone includes a column 107 configured to direct airflow provided by a player through a mouthpiece toward the column 107 through a neck 108, a body 107 and bow 112 and eventually out the bell 110 as one or more audio tones. The mouthpiece 105 is designed to engage a player's mouth for producing the airflow via a wooden or synthetic reed (not shown) such that the mouthpiece 105 attaches to the instrument 100 adjacent to a neck 109 at a neck cork 109 at the initial opening of the column 107. Further, the reed may be secured to the mouthpiece 105 using a ligature 111. The vibration of the reed produces airflow having a specific wavelength (e.g., tone) that is then altered by opening and closing valves in the column 107 to produce a specific desired note from the instrument 100. In an embodiment described next, specific details about the mouthpiece 105 and the ligature are discussed next with respect to FIGS. 2-5. In further embodiments described later, specific details about the neck 109 are discussed below with respect to FIG. 6.

Figure 2:
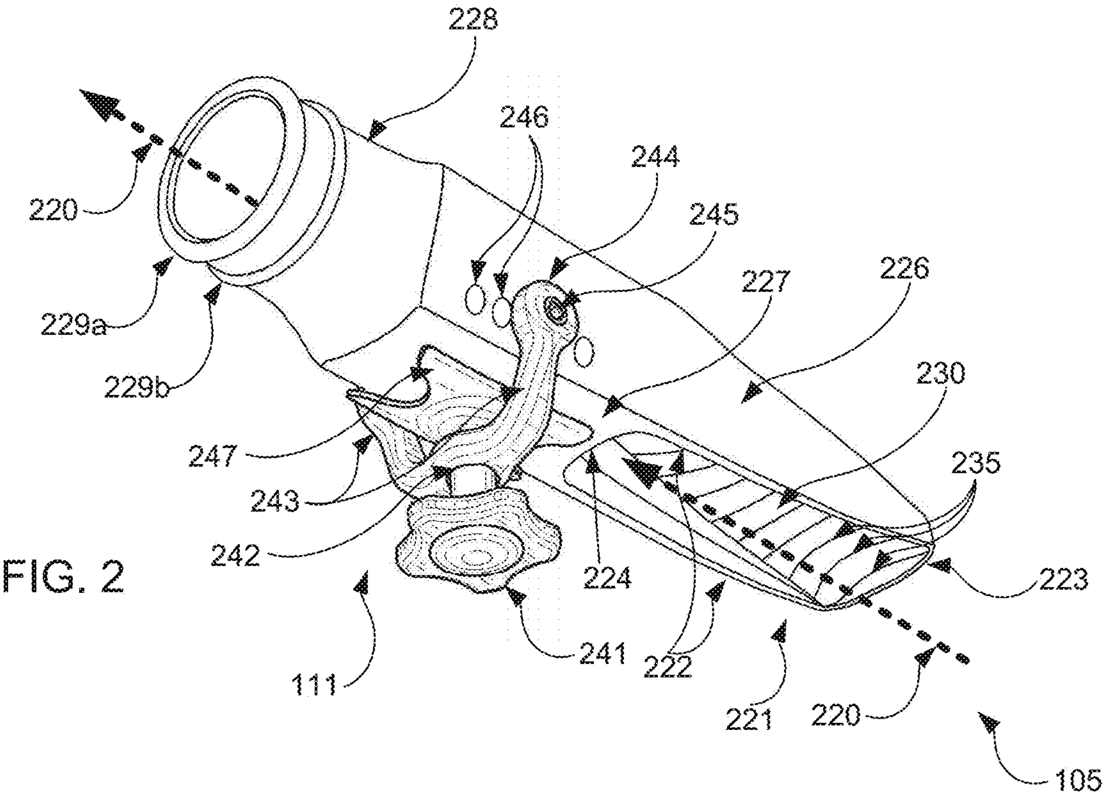
FIG. 2 is a diagram a mouthpiece according to an embodiment of the subject matter disclosed herein.

FIG. 2 is a diagram of a mouthpiece 105 according to an embodiment of the subject matter disclosed herein. Generally speaking, all instruments' mouthpieces may be characterized as having a mouthpiece body 226 with a tip 223 disposed at an end configured to engage the human player and a shank 228 configured to engage the instrument column (not shown in FIG. 2). The end having the tip 223 includes a tip opening 221 that is configured to be flanked by two side rails 222 whereupon a reed (not shown) may partially cover the tip opening when secured in place by the ligature 111. The reed is not shown in FIG. 2 such that a baffle 230 (e.g., a floor of a mouthpiece chamber 224 near the tip opening 221) may be seen whereupon the baffle exhibits modifications 235 that may alter the airflow is a musically desirable manner. Note that floor here is used insomuch as the mouthpiece is oriented in a typical manner with respect to a wind instrument such as a saxophone. The skilled artisan understands that the modifications as discussed herein can be on any wall of any orientation, and as such, the baffle 230 is sometimes referred to herein as a wall. As such, airflow 220 is directed from a human player through the tip 223 and altered by the baffle 230 having modifications 235 (e.g., grooves or ridges on the wall of the baffle 230) toward a chamber 224 surrounded by the body 226 and then the shank 228 and eventually through the column of the instrument (not shown in FIG. 2). Aspects of the modifications 235 on the baffle 230 are discussed in greater detail below with respect to FIGS. 3-5 below. However next, aspects of the ligature 111 are discussed further.

In the embodiment of FIG. 2, the reed is not shown in an effort to show the baffle 230 having modifications 235 in greater detail. Nonetheless, a reed, when used during playing the instrument, may be secured to the mouthpiece using the ligature to hold the reed against a table 227. A conventional ligature normally extends circumferentially around the entire outer body 226 of the mouthpiece 105. Such conventional ligatures may include integral tightening mechanism used to secure the reed to the mouthpiece 105. Because of the mechanical coupling between the ligature 111, the mouthpiece 105 and the reed, the structure of the ligature 111 plays a role in the sound produced by the instruments, and several types of ligatures 111 are available from different companies, each having its own sound characteristics. Moreover, when the ligature 111 holds the reed in place, its element and the reed are held tightly against the mouthpiece 105 and there is no movement therebetween.

In the embodiment of FIG. 2, the ligature includes two ligature engagement arms 253 that come together at a threaded shaft engagement assembly 242. The threaded shaft may include a ligature screw 241 that may be actuated in a first direction (e.g., clockwise) to move a ligature plate 247 toward the table 227. Likewise, the ligature screw 241 may be actuated in a second direction (e.g., counterclockwise) to move a ligature plate 247 away the table 227. The ligature plate 247 may hold the reed (not shown) securely against the table 227 when tightened. Further, the ligature engagement arms 253 each culminate at a respective ligature arm engagement point 244 having a respective pin 245 configured to engage one of a plurality of ligature engagement holes 246. In this embodiment, each side of the mouthpiece 105 includes five ligature engagement holes 246 (only one side shown in this perspective), however other embodiment may have from one to eleven holes 246 per side.

The mouthpiece 105 also includes shank rings 229*a*/229*b* on the shank 228. In this embodiment of FIG. 2, the shank 228 includes a proximal shank ring 229*a* that is disposed on the outermost edge of the shank 228 toward the end of the mouthpiece 105 configured to engage the neck on the instrument. Further, the shank 228 includes a distal shank ring 229*b* that is positioned approximately 0.5 inches to 1.5 inches in form the proximal shank ring 229*a*. These shank rings 229*a*/229*b* provide additional mass to the mouthpiece 105 in a manner to produces a pleasing alteration to the sound of the mouthpiece 105 to the instrument.

Figure 3:
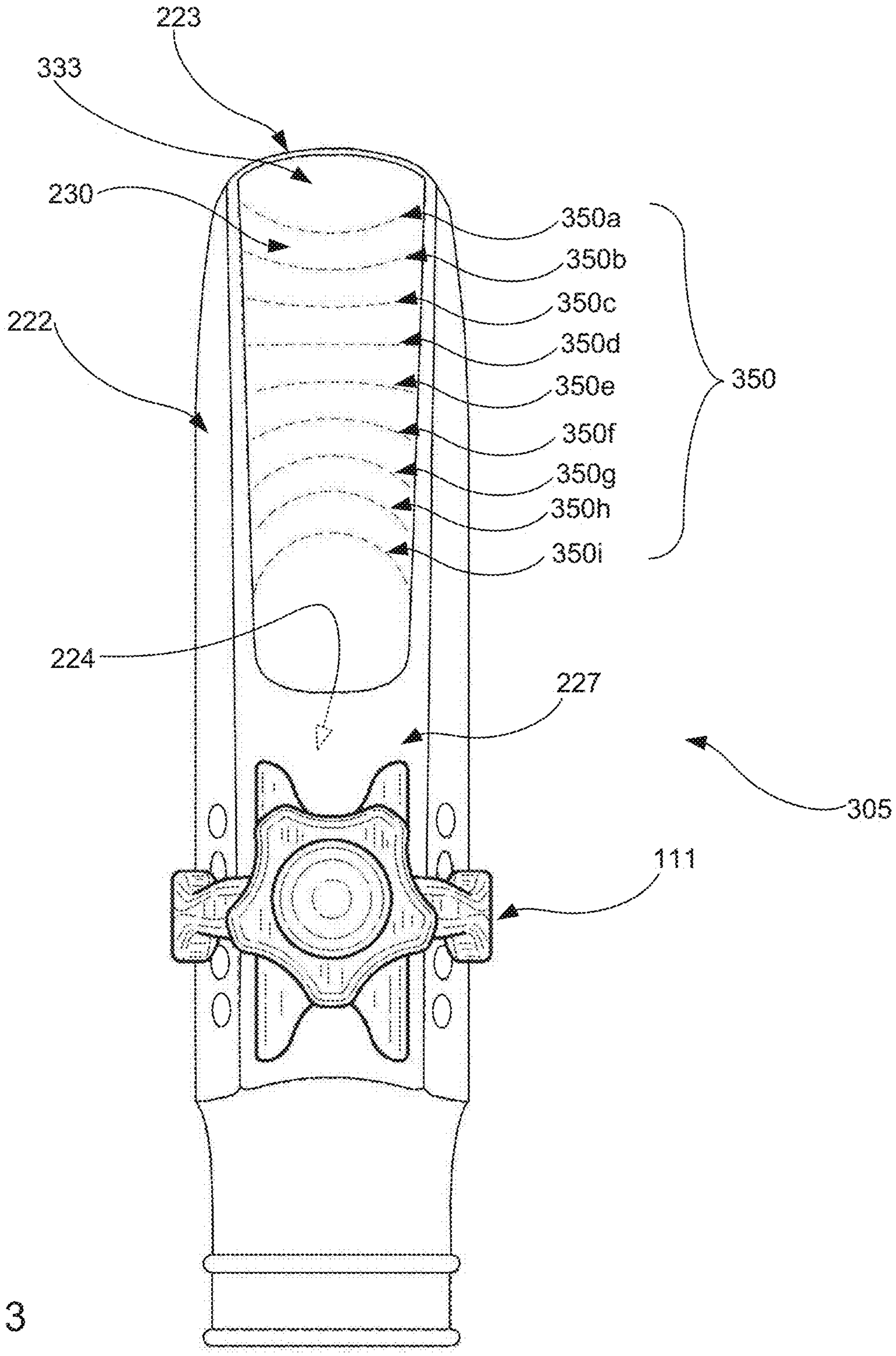
FIG. 3 is a plan view of a first modification pattern of the mouthpiece of FIG. 2 according to an embodiment of the subject matter disclosed herein.

FIG. 3 is a plan view of a first modification pattern 350 of a mouthpiece 305 according to an embodiment of the subject matter disclosed herein. In this embodiment, the pattern 350 is a series of curvilinear modifications disposed on the baffle 230 (e.g., a top wall of the opening of the mouthpiece 305 leading to the mouthpiece chamber 224. Again, this view shows the mouthpiece without a reed disposed thereon so as to adequately show the pattern 350 of the series of curvilinear modifications disposed on the baffle 230. Thus, at the mouthpiece tip 223, a tip opening 333 would normally be present if a reed were to be shown engaged with the mouthpiece (e.g., held against the table 227 by the ligature 111), the tip opening 333 allows a player to generate airflow through the mouthpiece across the baffles 230 that is flanked by side rails 222 into the chamber 224 and ultimately to the column of the attached instrument. Conventional mouthpieces strive to make the baffle 230 as smooth as possible in an effort to reduce any and all resistance to the airflow through the chamber. However, as discussed next, disruption of the airflow in specific manners using carefully crafted patterns of modifications to the baffle 230 introduces pleasing and desirables alterations to the sounds produced by the instrument.

As briefly mentioned above, the embodiment of FIG. 3 shows a pattern 350 of a series of curvilinear modifications disposed on the baffle 230. Each modification 350*a*-350*i* may be a continuous elongated modification to the wall of the baffle 230 such that airflow coming across each modification 350*a*-350*i* is affected in at least a slight manner. That is, a conventional smooth surface would have minimal to zero effect on the overall airflow through the mouthpiece 305. However, the pattern 350 of modifications causes small eddy currents of airflow as air closest to the modifications are caused to change trajectory slightly. As such, the overall airflow may be coherent (or close to coherent at the outset of generating airflow, but the modifications tend to shape to the airflow into less coherency (e.g., airflow having slight eddy currents at the perimeter of the airflow).

The pattern 350 is characterized in this embodiment as nine curvilinear modifications 350*a*-350*i* (more or fewer are contemplated in additional embodiments) that extend from one side rail 222 to the opposite side rail and are disposed on the baffles (e.g., top wall of mouthpiece opening). The pattern 350 in FIG. 3 begins with a first modification 350*a* that includes a parabolic line having a focus fairly close to the tip 223 (e.g., the curve of the parabolic is fairly pronounced. As the pattern 350 progresses to modifications 350*b*, 350*c*, and 350*d*, each next parabolic modification has a respective focus that is further away from the baffle (e.g., the amount of curvature declines with each successive modification). In fact, modification 350*d* may be characterized as strictly linear. As the pattern 350 progresses further to modifications 350*e*-350*i*, the parabolic pattern shifts its focus to the chamber side of the baffle 230. That is, the modifications 350*e*-350*i* begin to curve downward and increasingly more so.

In one embodiment of the mouthpiece 305, the modifications 350*a*-350*i* on the baffles may be grooves such that the modification comprises an indentation into the wall of the baffle 230. In another embodiment of the mouthpiece 305, the modifications 350*a*-350*i* on the baffles may be ridges such that the modification comprises a raised portion disposed on the wall of the baffle 230. The modifications may be etchings or printings and may be integral to the mouthpiece 305 during manufacture. The mouthpiece 305 may be made of a composite material such as rubber, plastic, or porcelain. In other embodiments, the mouthpiece may be made of a metal or metal alloy such as brass or steel. As is discussed next with respect to FIGS. 4-5, the pattern 350 of modifications may be different so as to produce differently desirable disruptions to the overall airflow.

Figure 4:
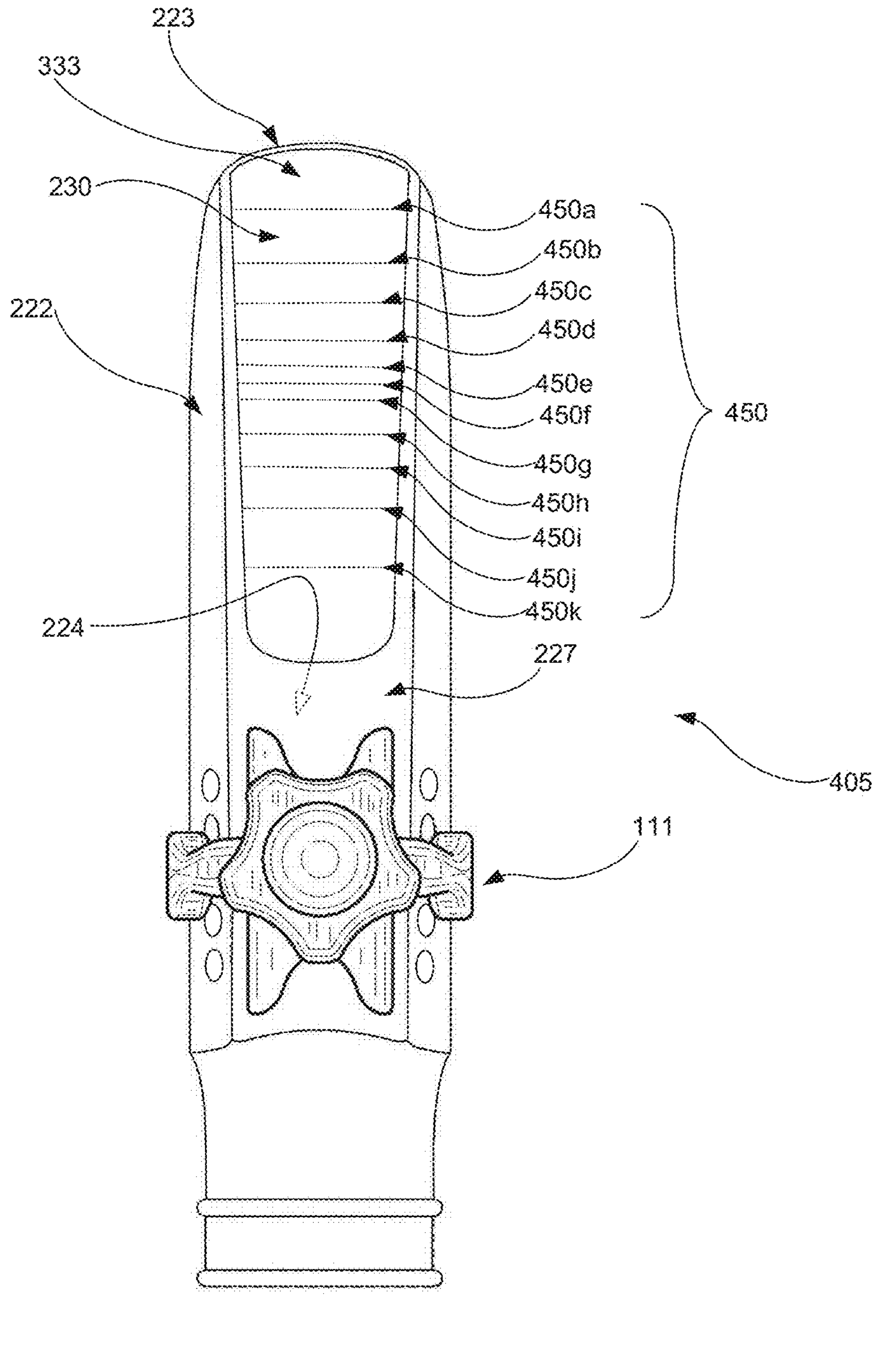
FIG. 4 is a plan view of a first modification pattern of the mouthpiece of FIG. 2 according to an embodiment of the subject matter disclosed herein.

FIG. 4 is a plan view of a second modification pattern 450 of a mouthpiece 405 according to an embodiment of the subject matter disclosed herein. In this embodiment, the pattern 450 is a series of differently distanced linear modifications disposed on the baffle 230 (e.g., a top wall of the opening of the mouthpiece 405 leading to the mouthpiece chamber 224). Again, this view shows the mouthpiece without a reed disposed thereon so as to adequately show the pattern 450 of the series of differently distanced modifications disposed on the baffle 230. Thus, at the mouthpiece tip 223, a tip opening 333 would normally be present if a reed were to be shown engaged with the mouthpiece (e.g., held against the table 227 by the ligature 111), the tip opening 333 allows a player to generate airflow through the mouthpiece across the baffles 230 that is flanked by side rails 222 into the chamber 224 and ultimately to the column of the attached instrument.

The embodiment of FIG. 4 shows a pattern 450 of a series of differently distanced linear modifications disposed on the baffle 230. Each modification 450*a*-450*k* may be a continuous, elongated modification to the wall of the baffle 230 such that airflow coming across each modification 450*a*-450*k* is affected in at least a slight manner. That is, a conventional smooth surface would have minimal to zero effect on the overall airflow through the mouthpiece 405. However, the pattern 450 of modifications causes small eddy currents of airflow as air closest to the modifications are caused to change trajectory slightly. As such, the overall airflow may be coherent (or close to coherent at the outset of generating airflow, but the modifications tend to shape to the airflow into less coherency (e.g., airflow having slight eddy currents at the perimeter of the airflow).

The pattern 450 is characterized in this embodiment as eleven curvilinear modifications 450*a*-450*i* (more or fewer are contemplated in additional embodiments) that extend from one side rail 222 to the opposite side rail and are disposed on the baffles (e.g., top wall of mouthpiece opening). The pattern 450 in FIG. 4 begins with a first modification 450*a* that includes a linear line disposed fairly close to the tip 223. As the pattern 450 progresses to modifications 450*b*, 450*c*, 450*c*, and 450*e*, each next linear modification is disposed at different and smaller distance from the previous modification (e.g., the lines are disposed closer and closer together). When reaching a central modification 450*f*, the pattern 450 may then begin to exhibit larger distances between modification. That is, as the pattern 450 progresses to modifications 450*g*-450*k*, each next linear modification is disposed at different and larger distance from the previous modification (e.g., the lines are disposed further and further apart).

As before, the modifications 450*a*-450*k* on the baffles may be grooves such that the modification comprises an indentation into the wall of the baffle 230 or may be ridges such that the modification comprises a raised portion disposed on the wall of the baffle 230. The modifications may be etchings or printings and may be integral to the mouthpiece 405 during manufacture. The mouthpiece 405 may be made of a composite material such as rubber, plastic, or porcelain. In other embodiments, the mouthpiece may be made of a metal or metal alloy such as brass or steel.

Figure 5:
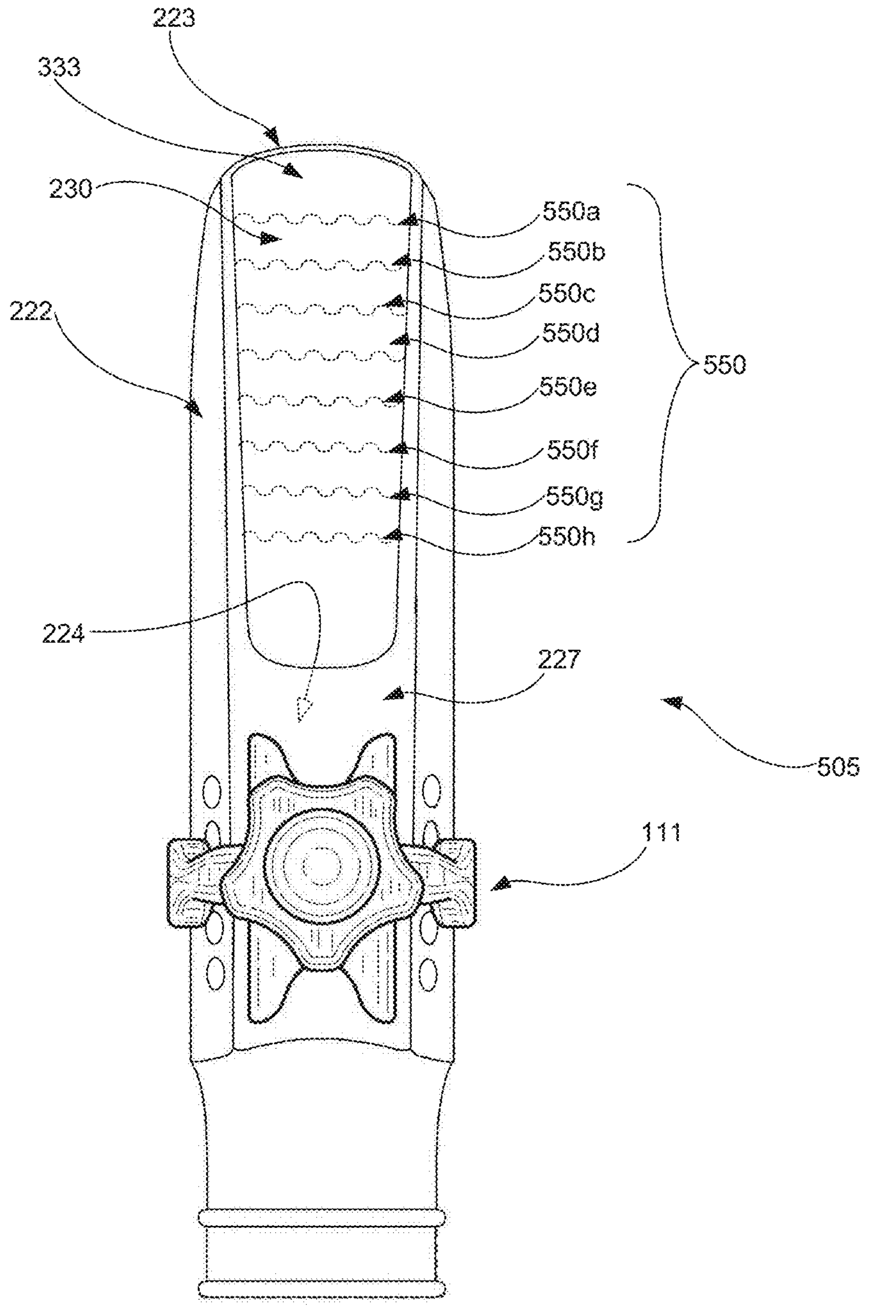
FIG. 5 is a plan view of a first modification pattern of the mouthpiece of FIG. 2 according to an embodiment of the subject matter disclosed herein.

The embodiment of FIG. 5 shows a pattern 550 of a series of differently distanced linear modifications disposed on the baffle 230. Each modification 550*a*-550*h* may be a continuous, sinusoidal modification to the wall of the baffle 230 such that airflow coming across each modification 550*a*-

550*h* is affected in at least a slight manner. This pattern 550 is characterized in this embodiment as seven curvilinear modifications 550S-**550*h* (more or fewer are contemplated in additional embodiments) that extend from one side rail 222 to the opposite side rail and are disposed on the baffles (e.g., top wall of mouthpiece opening). The pattern 550 in FIG. 5 begins with a first modification 550*a* that includes a sinusoidal line disposed fairly close to the tip 223. As the pattern 550 progresses to the remaining modifications 550*b*-550*h***, each next sinusoidal modification is disposed at an equivalent distance from the previous modification (e.g., the sinusoidal modifications are evenly distributed on the baffle) .

As before, the modifications **550*b*-550*h* on the baffles may be grooves such that the modification comprises an indentation into the wall of the baffle 230 or may be ridges such that the modification comprises a raised portion disposed on the wall of the baffle 230. The modifications may be etchings or printings and may be integral to the mouthpiece 505 during manufacture. The mouthpiece 505 may be made of a composite material such as rubber, plastic, or porcelain. In other embodiments, the mouthpiece 505** may be made of a metal or metal alloy such as brass or steel.

Figure 6:
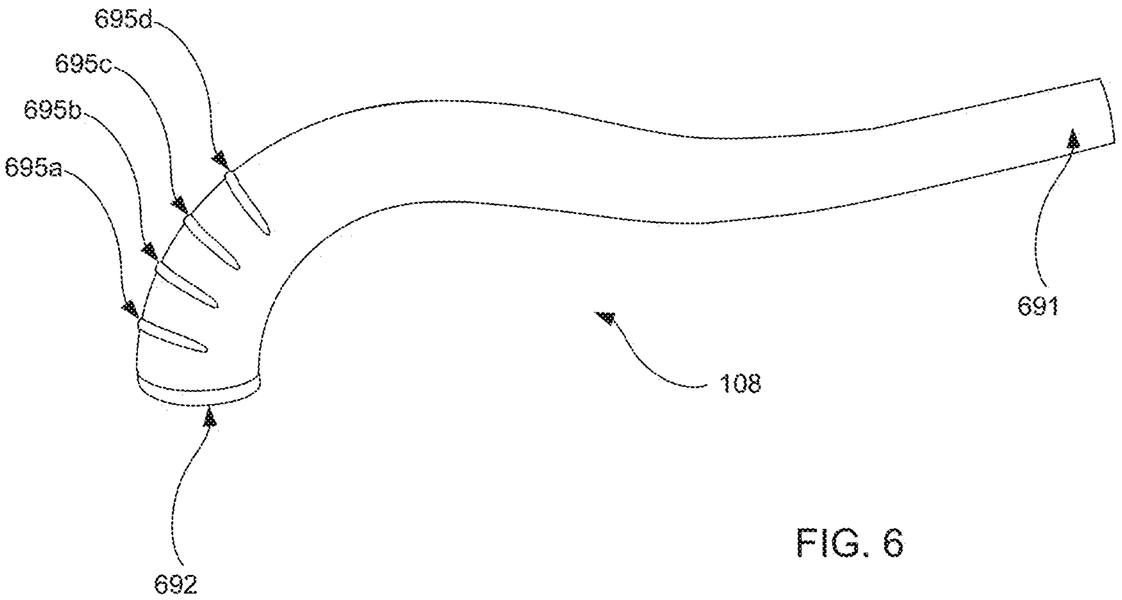
FIG. 6 is a diagram of an instrument neck according to an embodiment of the subject matter disclosed herein.

FIG. 6 is a view of a neck 109 of a musical instrument having a modification pattern 695 according to an embodiment of the subject matter disclosed herein. In this embodiment, the pattern is a series of curvilinear modifications **695*a-d* disposed on an interior wall of the neck 109 adjacent to an end 692 of the neck 109 to be coupled to the instrument body 107 (not shown in FIG. 6). In other embodiments not shown, curvilinear modifications 695*a-d* may be disposed on an interior wall of the neck 109 adjacent to an end 691 of the neck 109 to be coupled to the mouthpiece 105 (not shown in FIG. 6**). Conventional necks strive to make the interior walls of the neck as smooth as possible in an effort to reduce any and all resistance to the airflow through the chamber to the instrument column. However, as discussed previously, disruption of the airflow in specific manners using carefully crafted patterns of modifications to the interior walls of instruments parts prior to the column introduces pleasing and desirables alterations to the sounds produced by the instrument.

The embodiment of FIG. 6 shows a pattern of a series of curvilinear modifications **695*a-d* disposed on the interior wall of the neck 109. Each modification 695*a-d* may be a continuous elongated modification to the interior wall of the neck 109 such that airflow coming across each modification 695*a-d* is affected in at least a slight manner. That is, a conventional smooth surface would have minimal to zero effect on the overall airflow through the neck 109. However, the pattern of modifications 695*a-d*** causes small eddy currents of airflow as air closest to the modifications are caused to change trajectory slightly. As such, the overall airflow may be coherent (or close to coherent at the outset of generating airflow, but the modifications tend to shape to the airflow into less coherency (e.g., airflow having slight eddy currents at the perimeter of the airflow).

The pattern is characterized in this embodiment as four curvilinear modifications **695*a-d* (more or fewer are contemplated in additional embodiments) that extend approximately halfway around the circumference of the neck 109. In one embodiment, the modifications 695*a-d* may be grooves such that the modification comprises an indentation into the wall of the neck 109. That is, as shown, the modifications 695*a-d* protrude from the exterior wall of the neck 109. In another embodiment, the modifications 695*a-d* may be ridges such that the modification comprises a raised portion disposed on the wall of the neck 230. That is, as shown, the modifications 695*a-d* protrude from the interior wall of the neck 109. The modifications may be etchings or printings and may be integral to the neck 109 during manufacture. The neck 109 may be made of a composite material such as rubber, plastic, or porcelain. In other embodiments, the neck 109 may be made of a metal or metal alloy such as brass or steel. As is discussed previously with respect to FIGS. 3-5, the pattern of modifications 695*a-d* may be different so as to produce differently desirable disruptions to the overall airflow. In yet other embodiment, the modification may be disposed on walls of the body 107, bow 112, or bell 110** as well as combination thereof.

Figure 7:
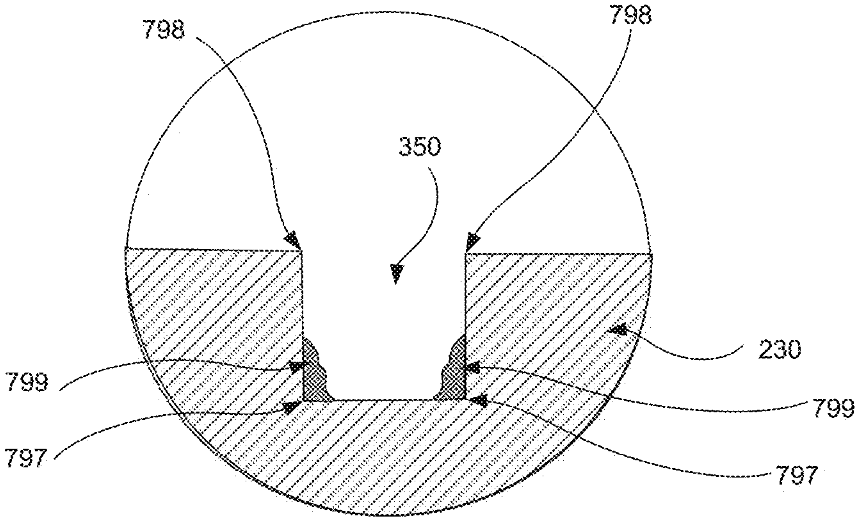
FIG. 7 is a cutaway view cross-section view of one embodiment of modification showing angular corners in a groove according to an embodiment of the subject matter disclosed herein.

FIG. 7 is a cutaway view cross-section view of one embodiment of modification showing angular corners in a groove according to an embodiment of the subject matter disclosed herein. As discussed previously, each modification **350*a*-350*i* (FIG. 3) may be a continuous elongated modification to the wall of the baffle 230 such that airflow coming across each modification 350*a*-350*i* is affected in at least a slight manner. That is, a conventional smooth surface would have minimal to zero effect on the overall airflow through the mouthpiece 305. However, the pattern 350** of modifications causes small eddy currents of airflow as air closest to the modifications are caused to change trajectory slightly. As such, the overall airflow may be coherent (or close to coherent at the outset of generating airflow, but the modifications tend to shape to the airflow into less coherency (e.g., airflow having slight eddy currents at the perimeter of the airflow).

In this embodiment as discussed above in FIG. 3 as well as a close-in cross section of one modification 350 here in FIG. 7, one can see the general shape of the modification as being angular. That is, the groove exhibits a valley having a first set 798 of approximately 90-degree corners flanking the modification 350 at the surface of the baffle 230. The valley created also exhibits a second set 797 of approximately 90-degree corners flanking the modification 350 at the base of the valley set into the baffle 230. While this design provides the pleasing benefits of airflow disruption passing across the surface of the baffle 230, it tends to collect debris 799 deep inside the modification 350 at the interior corners 797. The collection of debris 799 does not alter the pleasing effects of airflow disruption but may impact the pleasing effects of having a clean and sanitary mouthpiece. The collection of debris 799 may be mitigated by realizing a differently shaped modification 350 as discussed next with respect to FIG. 8.

Figure 8:
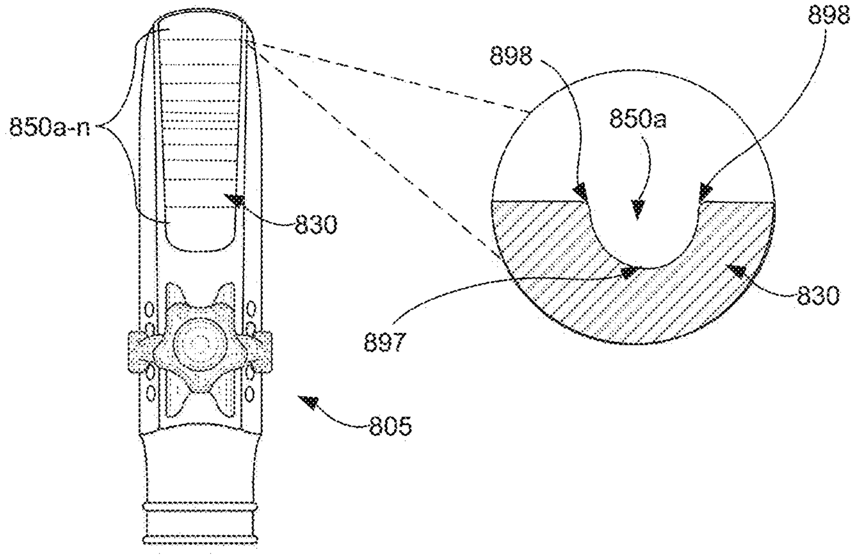
FIG. 8 is a diagram of another instrument mouthpiece having a cutaway view cross-section view of one embodiment of modification showing curvilinear corners in a groove according to an embodiment of the subject matter disclosed herein.

FIG. 8 is a diagram of another instrument mouthpiece 805 having a cutaway view cross-section view of one embodiment of modification **850*a* showing curvilinear contours 898 in a groove 897 according to an embodiment of the subject matter disclosed herein. In this embodiment, the mouthpiece may have a series of linear modifications 850*a-n* that exhibit curvilinear grooves 897 that constitute each modification 850*a-n*. That is, the groove 897 exhibits a valley having a first set 898 of curvilinear contours flanking the modification 850*a* at the surface of the baffle 830. The groove 897 created also exhibits a smooth curvilinear contour throughout the parabolic valley set into the baffle 830. This design provides the pleasing benefits of airflow disruption passing across the surface of the baffle 830, as well as mitigating or eliminating the collection of debris deep inside the modification 850*a*. As such, the grooves 897, themselves, may be referred to as having a curvilinear shape while each elongated modification may also have linear, parabolic, sinusoidal, or curvilinear characteristic. That is, as shown in FIG. 8, as but one example, e.g., the elongated modifications 850***a-n* are all linear in their elongated characteristic that spans the baffle 830 as well as each one 850*a-n* having a curvilinear groove/valley 897 carved into the baffle 830.

Figure 9:
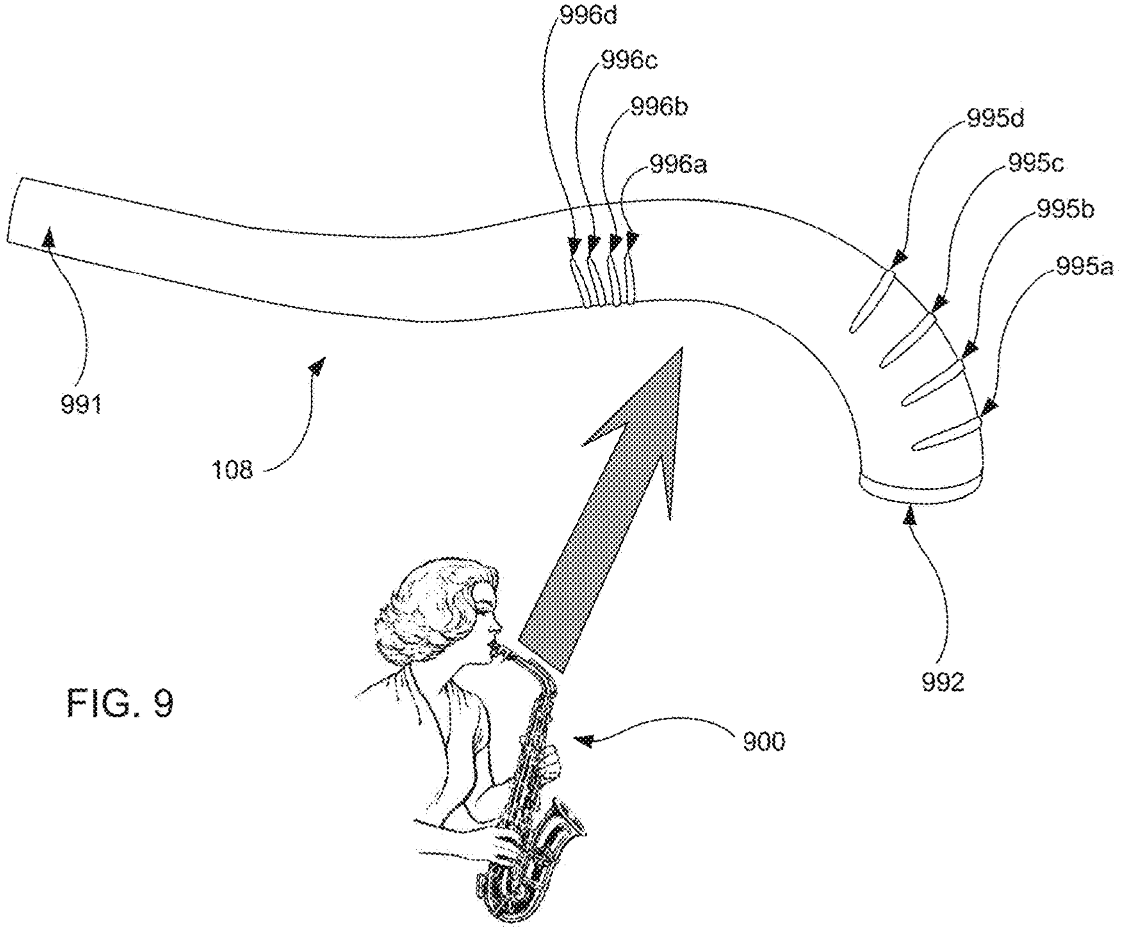
FIG. 9 is a diagram of a woodwind instrument having interior body walls that exhibit an airflow disruption apparatus according to an embodiment of the subject matter disclosed herein.

The embodiment of FIG. 9 shows a pattern of a series of curvilinear modifications 695*a-d* and 696*a-d* disposed on the interior wall of the neck 109 of a woodwind instrument (in this case, a tenor saxophone 900). In previous embodiments, the set or series of curvilinear modifications were disposed adjacent to a reed (e.g., in a reeded, woodwind instrument). Differently, the embodiment of FIG. 9 (and FIG. 10 described below) shows that the set of series of curvilinear modifications that may be disposed on an interior wall of the neck, column, or body of an instrument, e.g., not immediately adjacent to a reed of a woodwind instrument. Thus, several different curvilinear modifications 695*a-d* and 696*a-d* may be disposed on the interior wall or walls of an instrument. Further, such modifications 695*a-d* and 696*a-d* are separate and distinct form tone-changing modification in which a player may actuate to change the tone of a note being played by the instrument. That is, in a woodwind instrument, the column includes tone holes that can be covered and uncovered to change notes and these "modifications" in the column wall are not the same as air-flow disruption modifications that are the subject of the present disclosure.

As shown in the embodiment of FIG. 9, each modification 695*a-d* may be a continuous elongated modification to the interior wall of the neck 109 such that airflow coming across each modification 695*a-d* is affected in at least a slight manner. That is, a conventional smooth surface would have minimal to zero effect on the overall airflow through the neck 109. However, the pattern of modifications 695*a-d* causes small eddy currents of airflow as air closest to the modifications are caused to change trajectory slightly. As such, the overall airflow may be coherent (or close to coherent at the outset of generating airflow, but the modifications tend to shape to the airflow into less coherency (e.g., airflow having slight eddy currents at the perimeter of the airflow). This is also the case for a possible second set of curvilinear modifications 696*a-d* disposed in the neck 109 although closer to the mouthpiece attachment end 991 of the neck 109. In other embodiments (not shown), a second (or third) set of curvilinear modifications 696*a-d* may be disposed closer to the column attachment end 992 of the neck 109 or even into eth column (107 of FIG. 1) itself.

These airflow disruption features within the instrument airflow chambers (e.g., the neck, the body, the column, the bell and the like) disrupt laminar airflow and create turbulence that may enhance the sounds produced in a pleasing manner. Such turbulence in the airstream can flow more evenly across the width of the entire inner diameter of the instrument walls. This creates a 'fuller' sound. Airflow disruption features, can include, but are not limited to indentations or protrusions throughout the interior of the instrument solely for the purpose of disrupting the airflow. This can take the form of lines, markings, dents, or bumps with the instrument wall. Further, it is contemplated that the embodiments as shown in FIG. 9 may be equally applicable to all woodwind instruments including saxophones (sopranino, soprano, alto, tenor, baritone, and bass), clarinets: (Eb, Bb, alto, bass, contra-bass), flutes (piccolo, C, alto, bass), oboe, bassoon, and recorder.

The pattern is characterized in this embodiment as four curvilinear modifications 695*a-d* and 696*a-d* (more or fewer are contemplated in additional embodiments) that extend approximately half-way around the circumference of the neck 109. In one embodiment, the modifications 695*a-d* and 696*a-d* may be grooves such that the modification comprises an indentation into the wall of the neck 109. That is, as shown, the modifications 695*a-d* and 696*a-d* protrude from the exterior wall of the neck 109. In another embodiment, the modifications 695*a-d* and 696*a-d* may be ridges such that the modification comprises a raised portion disposed on the wall of the neck 109. That is, as shown, the modifications 695*a-d* and 696*a-d* protrude from the interior wall of the neck 109. The modifications may be etchings or printings and may be integral to the neck 109 during manufacture. The neck 109 may be made of a composite material such as rubber, plastic, or porcelain. In other embodiments, the neck 109 may be made of a metal or metal alloy such as brass or steel. As was discussed previously with respect to FIGS. 3-5, the pattern of modifications 695*a-d* and 696*a-d* may be different so as to produce differently desirable disruptions to the overall airflow. In yet other embodiment, the modifications 695*a-d* and 696*a-d* may be disposed on walls of the body 107, bow 112, or bell 110 as shown in FIG. 1 as well as combinations thereof.

Figure 10:
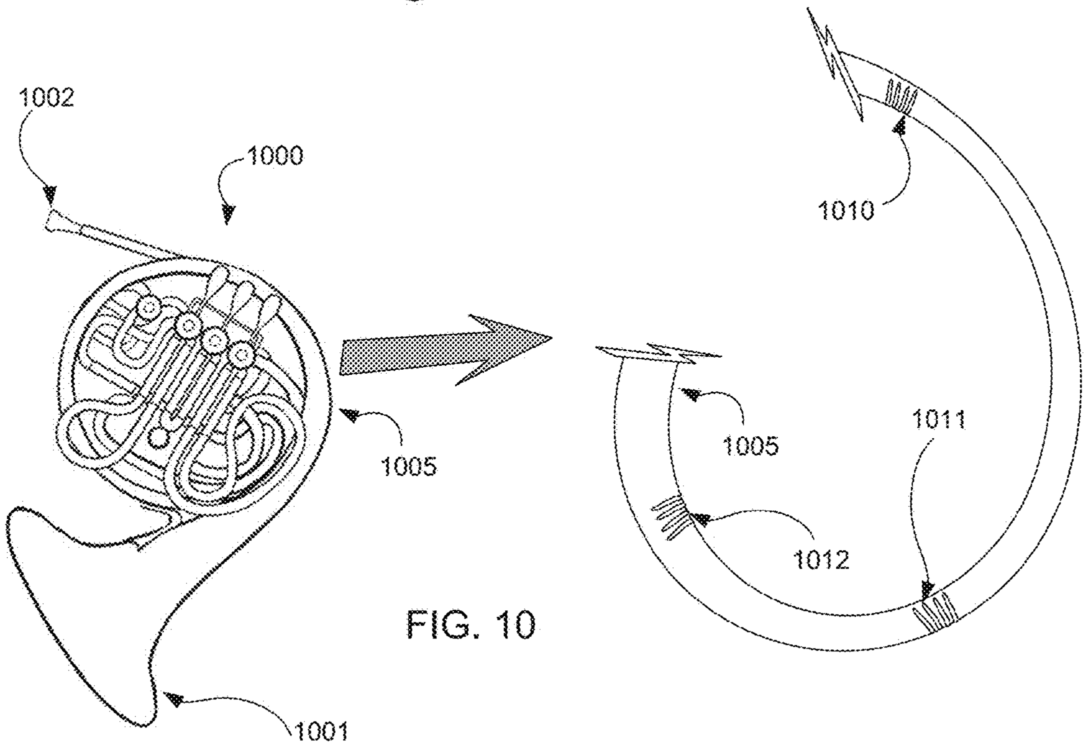
FIG. 10 is a diagram of a brass instrument having interior body walls that exhibit an airflow disruption apparatus according to an embodiment of the subject matter disclosed herein.

As FIG. 9 is directed to woodwind families of instruments, FIG. 10 shows an embodiment applicable to brass instruments.

The embodiment of FIG. 10 shows a pattern of a series of sets of curvilinear modifications 1010, 1011 and 1012 disposed on an interior wall of the body 1005 of a brass instrument (in this case, a French horn 1000). In previous embodiments, the set or series of curvilinear modifications were disposed adjacent to a reed (e.g., in a reeded, woodwind instrument). Differently, the embodiment of FIG. 10 shows sets or series of curvilinear modifications that may be disposed on an interior wall of the neck, column, or body of a brass instrument, e.g., not immediately adjacent to a reed as a brass instrument does not have a reed. Thus, several different curvilinear modifications 1010, 1011 and 1012 may be disposed on the interior wall or walls of the brass instrument 1000. Further, such modifications 1010, 1011 and 1012 are separate and distinct from tone-changing modifications in which a player may actuate to change the tone of a note being played by the instrument. That is, in a brass instrument, the instrument column may be a closed-air column that includes valves or sliders that can be actuated to change notes and these "modifications" in the closed-air column wall are not the same as air-flow disruption modifications that are the subject of the present disclosure.

As shown in the embodiment of FIG. 10 (as was the case with FIG. 9), each modification may be a continuous elongated modification to the interior wall of the body tube 1005 (wherein the body tube may be all portions of a brass instrument between a mouthpiece 1002 and a bell 1001) such that airflow coming across each modification is affected in at least a slight manner. That is, a conventional smooth surface would have minimal to zero effect on the overall airflow through the body tube 1005. However, the pattern of modifications 1010, 1011 and 1012 causes small eddy currents of airflow as air closest to the modifications are caused to change trajectory slightly. As such, the overall airflow may be coherent (or close to coherent at the outset of generating airflow, but the modifications tend to shape to the airflow into less coherency (e.g., airflow having slight eddy currents at the perimeter of the airflow).

These airflow disruption features 1010, 1011 and 1012 within the instrument airflow chambers (e.g., the neck, the body, the column, the bell and the like) disrupt laminar airflow and create turbulence that may enhance the sounds produced in a pleasing manner. Such turbulence in the airstream can flow more evenly across the width of the entire inner diameter of the instrument walls. This creates a 'fuller' sound. Airflow disruption features, can include, but are not limited to indentations or protrusions throughout the interior of the instrument solely for the purpose of disrupting the airflow. This can take the form of lines, markings, dents, or bumps with the instrument wall. Further, it is contemplated that the embodiments as shown in FIG. 10 may be equally applicable to all brass instruments including bugle, trumpet, cornet, piccolo trumpet, flugelhorn, French horn, mellophone, euphonium, trombone, tuba, sousaphone, cimbasso, and helicon.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

Since many alterations, variations, and changes in detail can be made to the described preferred embodiments of the subject matter, it is intended that all matters in the foregoing description and shown in the accompanying drawings be interpreted as illustrative and not in a limiting sense. Thus, the scope of the subject matter should be determined by the appended claims and their legal equivalence.

What is claimed is:

1. A musical instrument, comprising:

an air pathway configured to direct air toward a column in a musical instrument;

a wall disposed in the column;

a plurality of tone-changing modifications disposed on the wall; and a plurality of airflow disruption modifications distinct from the plurality of tone-changing modification disposed on the wall, the plurality of airflow disruption modification configured to disrupt airflow differently than the plurality of tone-changing modifications.

2. The musical instrument of claim 1, further comprising a woodwind instrument wherein the plurality of tone-changing modifications comprise tone holes disposed in the column.

3. The musical instrument of claim 1, further comprising a brass instrument wherein the plurality of tone-changing modifications comprise valves disposed in the column.

4. The musical instrument of claim 1, further comprising a brass instrument wherein the plurality of tone-changing modifications comprise sliding elements disposed in the column.

5. The musical instrument of claim 1, wherein the air-flow disruption modifications comprise ridges raised beyond a surface of the wall.

6. The musical instrument of claim 1, wherein the plurality of air-flow disruption modifications comprise valleys etched into a surface of the wall.

7. The musical instrument of claim 1, wherein the plurality of air-flow disruption modifications comprises:

a first set of curvilinear modifications having linear elongated modifications disposed on the wall in a first location of the wall;

a second set of curvilinear modifications having parabolic elongated modifications disposed on the wall in a second location of the wall, each modification in the second set having a parabolic focus increasingly more distant from each respective modification in a direction away from the first set; and a third set of modifications having parabolic elongated modifications disposed on the wall in a third location, each modification in the third set having a parabolic focus increasingly more distant from each respective modification in a direction away from the first set.

8. The musical instrument of claim 1, wherein the plurality of air-flow disruption modifications comprises:

a first set of curvilinear modifications having linear elongated modifications disposed on the wall in a first location of the wall;

a second set of curvilinear modifications having linear elongated modifications disposed on the wall in a second location of the wall, each modification in the second set disposed increasingly more distant from a respective previous modification in a direction away from the first set; and a third set of curvilinear modifications having linear elongated modifications disposed on the wall in a third location of the wall, each modification in the second set disposed increasingly more distant from a respective previous modification in a direction away from the first set.

9. The musical instrument of claim 1, wherein the plurality of air-flow disruption modifications comprises sinusoidal modifications disposed on the wall.

10. The musical instrument of claim 1, wherein the plurality of air-flow disruption modifications comprise three sets of air-flow disruption modifications grouped into four air-flow disruption modifications in each set.

11. The musical instrument of claim 1, wherein the plurality of air-flow disruption modifications comprise two sets of air-flow disruption modifications grouped into four air-flow disruption modifications in each set.

12. The musical instrument of claim 1, wherein the plurality of air-flow disruption modifications each comprise curvilinear air-flow disruption modifications.

13. A musical instrument, comprising:

a body having a column with body walls for airflow disposed therein;

a neck configured to be attached to the body;

a mouthpiece configured to be attached to the neck;

an air pathway through a chamber in the mouthpiece and configured to direct air toward the column;

a mouthpiece wall disposed in an opening to the chamber; and a first plurality of modifications disposed on the mouthpiece wall; and a second plurality of modifications disposed on the body wall.

14. The musical instrument of claim 13, further comprising:

a reed disposed adjacent to an opening of the mouthpiece; and a ligature for holding the reed next to the mouthpiece, the ligature including a first ligature arm for engaging one of a first set of a plurality of holes disposed on a first side of the mouthpiece and a second ligature arm for engaging one of a second set of holes disposed on a second side of the mouthpiece.

15. The musical instrument of claim 13 further comprising an instrument from the group comprised of an alto saxophone, a tenor saxophone, a baritone saxophone, a clarinet, an oboe, and a bassoon.

16. The musical instrument of claim 13, wherein the plurality of modifications each comprise curvilinear air-flow disruption modifications.

17. A method for passing air through a musical instrument, the method comprising directing airflow through an instrument chamber delineated by body walls having at least one tone-changing modification;

disrupting the flow of air though the chamber by passing the airflow over a plurality of curvilinear ridges disposed on wall distinct form the alterations form the tone-changing modifications; and directing the disrupted airflow out of the chamber.

18. The method of claim 17, wherein the airflow disrupting further comprises:

directing air to pass over a first set of curvilinear modifications having linear elongated modifications disposed on the wall in a first location of the wall;

directing air to pass over a second set of curvilinear modifications having parabolic elongated modifications disposed on the wall in a second location of the wall, each modification in the second set having a parabolic focus increasingly more distant from each respective modification in a direction away from the first set; and directing air to pass over a third set of curvilinear modifications having parabolic elongated modifications disposed on the wall in a third location of the wall, each modification in the third set having a parabolic focus increasingly more distant from each respective modification in a direction away from the first set.

19. The method of claim 17, wherein the airflow disrupting further comprises disrupting the airflow a second time by passing air over airflow disrupting modifications disposed in a mouthpiece coupled to the chamber.

20. The method of claim 17, wherein the disrupting further comprises directing air to pass over sinusoidal modifications having curvilinear valleys disposed on the wall.

* * * * *